May 15, 1956  H. G. ENGLISH ET AL  2,745,354
HYDRODYNAMIC COUPLING
Filed April 22, 1950  4 Sheets-Sheet 1

Inventors:
Herdis George English
Daniel C. Gillespie and
Vladimir J. Jandasek
By Edward C. Dietzlampe
Atty.

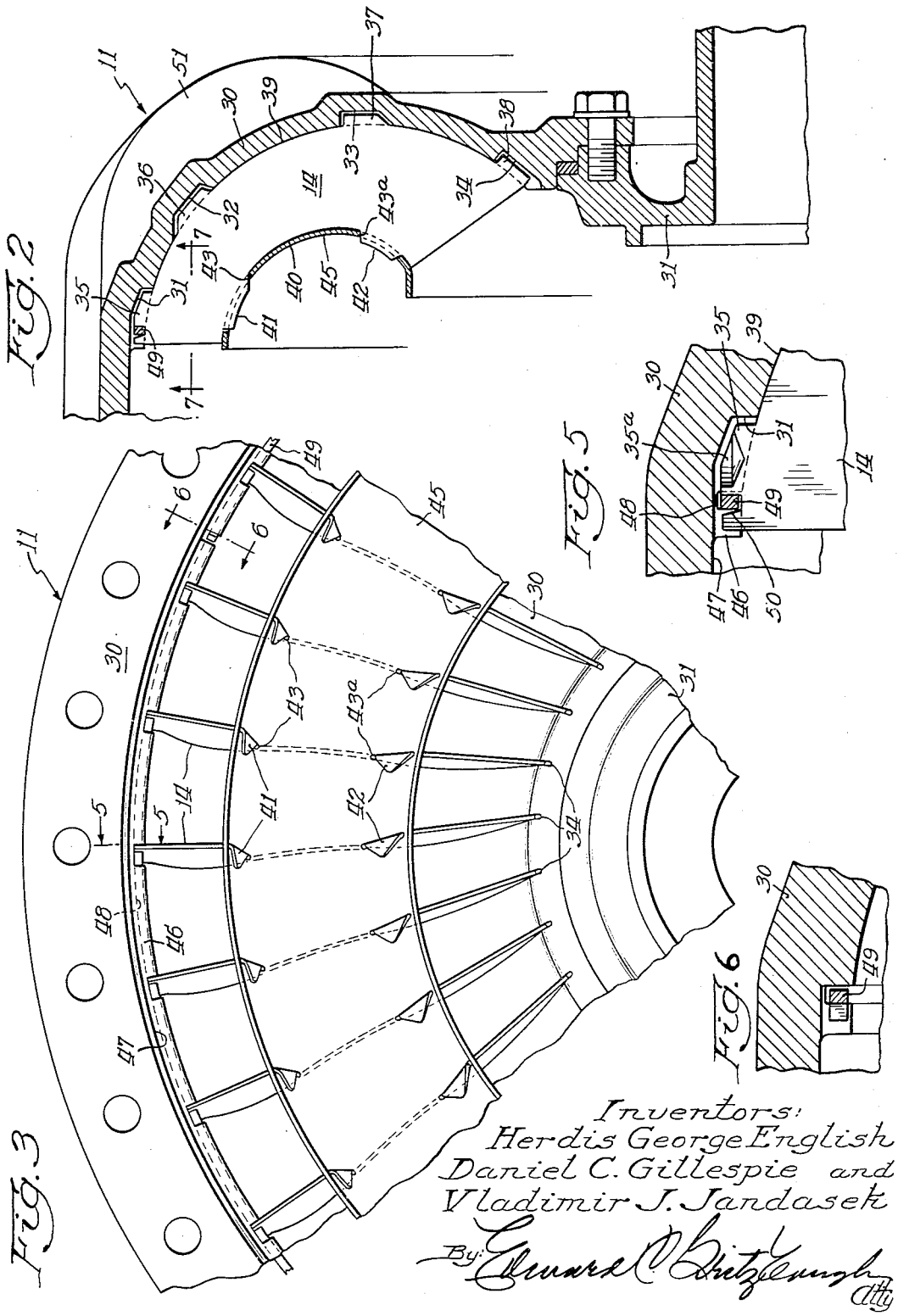

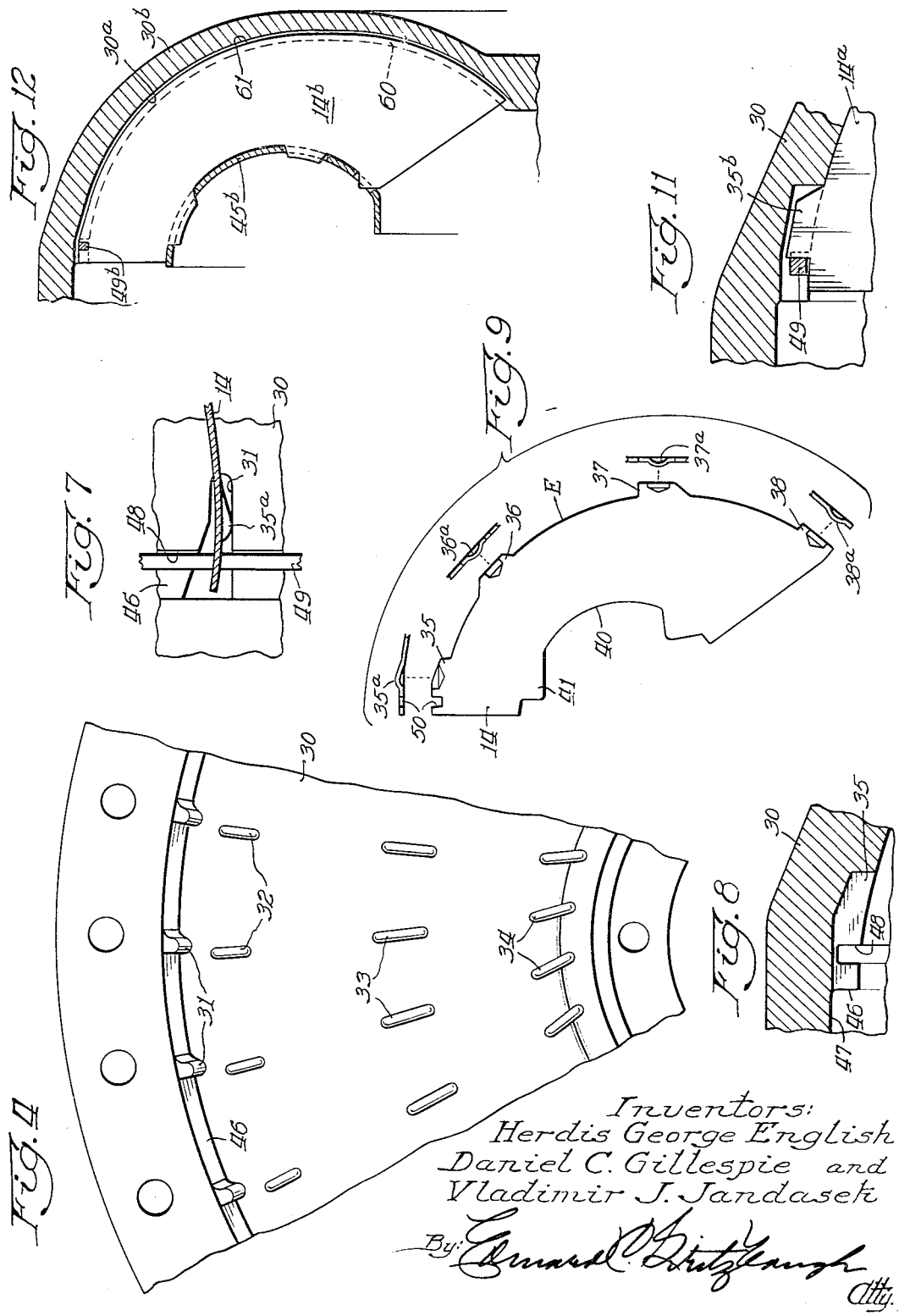

May 15, 1956 H. G. ENGLISH ET AL 2,745,354
HYDRODYNAMIC COUPLING
Filed April 22, 1950 4 Sheets-Sheet 4

Inventors:
Herdis George English
Daniel C. Gillespie and
Vladimir J. Jandasek
By: Edward C. Quitzlauf
Atty.

United States Patent Office 2,745,354
Patented May 15, 1956

2,745,354

HYDRODYNAMIC COUPLING

Herdis G. English, La Grange, Vladimir J. Jandasek, North Riverside, and Daniel C. Gillespie, Oak Park, Ill., assignors to Borg-Warner Corporation, Chicago, Ill., a corporation of Illinois Application April 22, 1950, Serial No. 157,602

10 Claims. (Cl. 103—115)

This invention relates to hydrodynamic coupling devices and, more particularly, such coupling devices which function to transmit torque from an engine to a work-performing structure.

Hydrodynamic coupling devices generally comprise a plurality of vaned elements including a driving element or impeller and a driven element or runner, drive being obtained by the energy imparted to a fluid medium by the impeller and received by the runner. Coupling devices not intended to multiply torque generally include only an impeller and runner, while coupling devices of the torque-multiplying type, or torque converters, include an impeller, a runner and a third vaned element or stator, the stator being held from rotation and having a reaction force impressed thereon by the fluid, the vanes of the impeller, runner and stator being designed with critical curvatures determined according to fluid mechanics principles for providing directional control to the fluid effective to provide multiplication of torque of the engine for transmission to a work-performing structure. Such hydrodynamic torque-multiplying coupling devices, or torque converters, are shown, for example, in Schneider et al. Patent No. 2,306,758 and in Schneider at al. Patent No. 2,333,680.

Considerable difficulty has been experienced in the past in the manufacture of hydrodynamic coupling devices and particularly those devices of the torque converter type. The impeller and runner of torque converter devices each usually comprise a hollow, substantially semi-toroidal casing and vanes which may be of aluminum and form an integral unit, for example, as by casting. However, fabrication of such vaned elements by casting imposes serious limitations on the curvature design of the vanes. As two molds are required, one to form the exterior of the casing and the other to form the interior of the casing and the vanes, the mold in the inside of the semi-toroidal casing must be moved axially, after the casting operation, to remove the mold from the casing and such movement frequently results in fracture or breakage of some of the curved vanes, a condition which may be considerably aggravated where the vanes are of thin section to provide as many vanes as practicable in the vaned element for accurate control of the flow of the fluid. It has been proposed that the casings of the vaned elements be cast of aluminum and that thin vanes of sheet steel be connected to such casing. However, the connection of the vanes to the casing presents a problem of positioning the vanes within the casing and connecting the vanes to the casing without bending or otherwise permanently distorting the vanes from their initial critical curvatures during the assembly operation.

It is an object of the present invention to provide an improved vaned hydrodynamic coupling element and method of fabricating the same.

It is another object of the invention to provide a vaned hydrodynamic coupling element and method of connecting individual sheet metal vanes to a casing of the element in a manner insuring the vanes being installed and maintained in the casing without distortion of the vanes.

It is a further object of the invention to provide a vaned hydrodynamic coupling element and method of fabricating the same, in which vanes are assembled with the casing by positioning the vanes in the casing and employing means for retaining the vanes and casing in assembly including a mechanical structure for interlocking the vanes and casing.

It is a further object of the invention to provide a vaned hydrodynamic coupling element and method of fabricating the same, in which sheet metal vanes have tabs insertable within recesses in a substantially semi-toroidal casing and retained therein by means including a mechanical interlocking element received within an annular groove in the casing and engaging adjacent tabs on the vanes.

A further object of the invention is to provide a vaned hydrodynamic coupling element of the torque-converting type and method of making the same, in which a casing of annular substantially semi-toroidal form is provided with a plurality of axial and radial recesses receiving tabs on curved vanes formed of sheet metal, the tabs and recesses being formed and arranged to permit the vane tabs to be readily inserted in the casing recesses without necessitating flexing or otherwise distorting the vanes and departure of the curvature of the vanes from their initial condition during assembly with the casing. The invention has for a further and distinct feature the employment of novel means for retaining the vanes in assembly with the casing including a mechanical interlocking element in the form of a snap ring positioned within a circumferentially extending groove in the casing, adjacent to and intersecting the axially extending vane tab-receiving recesses therein, engaging adjacent tabs in the recesses.

An additional object of the invention is to provide a fabricated hydrodynamic coupling element comprising substantially semi-toroidal casing and core members, and vanes having tabs received within recesses in the casing and core members, and a method of assembling the core member with the vanes in which the vane tabs and core member recesses extend in an axial direction permitting the core member to be readily and easily assembled with the vanes by movement of the core member axially of the assembled vanes and casing to position the vane tabs in the recesses of the core ring.

The invention consists of the novel constructions, arrangements, devices, processes and methods to be hereinafter described and claimed for carrying out the above-stated objects and such other objects as will appear from the following description of certain preferred embodiments and methods for making the same illustrated with reference to the accompanying drawings, wherein:

Fig. 2 is an enlarged view of an impeller or vaned driving element of the hydrodynamic coupling device shown in Fig. 1;

Fig. 3 is a front elevation of the vaned driving element shown in Fig. 2;

Fig. 4 is a view similar to Fig. 3 showing only a portion of the casing of the vaned driving element;

Figure 10:
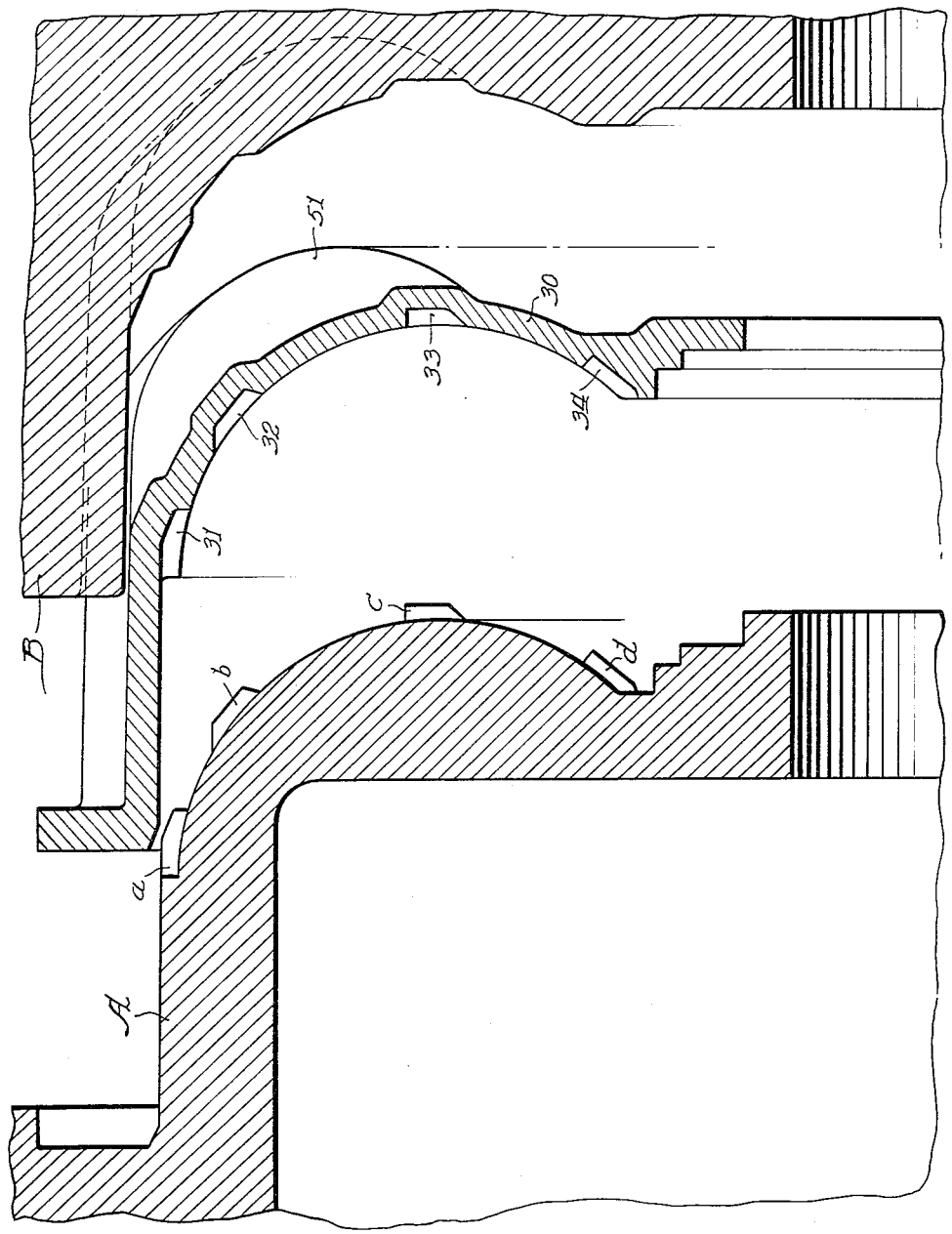

Figs. 5, 6, and 7 are greatly enlarged views of the connection between the radially outer portions of the vanes and the casing of the vaned driving element or impeller shown in Fig. 2, Fig. 5 being a view taken on line 5—5 of Fig. 3, Fig. 6 being a view taken on line 6—6 of Fig. 3, and Fig. 7 being a view taken on line 7—7 of Fig. 2;

Fig. 8 is a view of a portion of the casing of the driving element shown in Figs. 5 and 6;

Fig. 9 is a view of one of the vanes, the tabs on the vane being also shown edgewise to illustrate the conformation thereof;

Fig. 10 is a sectional view of the impeller casing and also the molding apparatus utilized in casting the casing of the impeller;

Fig. 11 is a view similar to Fig. 5 but illustrating a slightly different connection of the vane and casing; and Fig. 12 is a view similar to Fig. 2 but illustrating another embodiment of the invention.

Like characters of reference designate like parts in the several views.

Figure 1:
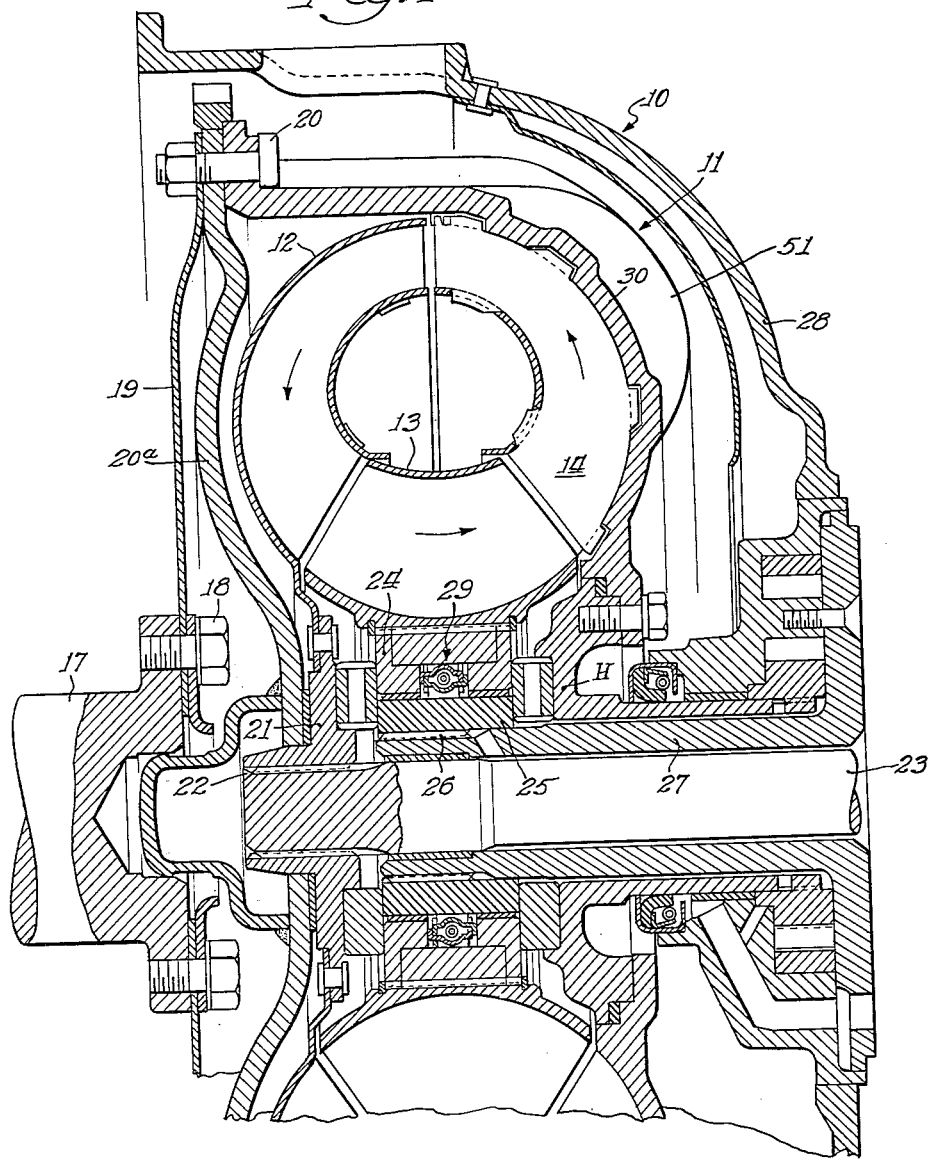
Fig. 1 is a side elevational view of the hydrodynamic coupling device embodying the present invention, the view being a vertical, longitudinal section of the device.

Referring now to the drawings, the hydrodynamic coupling device, shown in Fig. 1, is of the torque-multiplying type and is generally indicated at 10. The device comprises a vaned driving element or impeller 11, a vaned driven element or runner 12, and a vaned reaction element or stator 13, which constitute the three elements ordinarily found in a hydrodynamic torque converter, with the impeller element functioning to impart energy to a body of liquid in the torque converter, the driven or runner element receiving energy from the liquid, and the stator being held from rotation and functioning as a reaction element to change the direction of the flow of the liquid so that the coupling functions to multiply the torque. The impeller, runner and stator are each provided with a plurality of vanes arcuate in side elevation as shown in Fig. 1 and having curvatures, Fig. 3, in the direction of their thicknesses designed to provide a controlled flow of the fluid in a direction illustrated by the arrows in Fig. 1.

The impeller 11 is connected to an engine (not shown) having a shaft 17 driven thereby and having a flange connected by bolts 18 to a drive plate 19 which, in turn, is bolted as at 20 to the impeller 11 for driving the impeller. A plate 20a is rotatably supported by the drive shaft 17 and, as at 20, is bolted to the radially outer rim of the impeller and plate 19 and acts, in combination with the impeller, to provide a closed fluid chamber in which are disposed the turbine 12 and stator 13. The turbine 12 is provided with a hub 21 splined as at 22 to a driven shaft 23. The stator 13 has a hub 24 rotatably mounted on a collar 25 splined as at 26 to a stationary sleeve 27 of a transmission housing 28, the hub of the stator 24 having an overrunning clutch 29 associated therewith and engaging the stationary collar 25 to prevent rotation of the stator element in one direction of rotation during the torque-multiplication stages of the torque converter, the overrunning clutch 29 overrunning to permit rotation of the reaction element in an opposite direction of rotation upon the impeller and runner obtaining substantially the same speed, as is well known in the art.

The present invention is directed to the vaned hydrodynamic element or impeller 11 and the method of making the same. The impeller comprises an outer substantially semi-toroidal casing 30 bolted to a hub portion H in the form of a sleeve rotatably mounted upon the stationary sleeve 27. The casing 30 is of substantially semi-toroidal form as shown in Figs. 1, 2 and 3 and is preferably made of cast aluminum. The casing 30 is provided with a plurality of radially spaced sets of recesses in the interior surface thereof identified at 31, 32, 33, and 34, the recesses of each set being in circumferentially spaced relation to each other as shown clearly in Fig. 4. The impeller element also comprises a plurality of vanes 14, each of which has a curvature, as illustrated in Fig. 3, particularly designed in accordance with well known principles of fluid mechanics to give a controlled directional flow of the fluid from the stator 13 into the runner 12. The vanes are preferably formed of sheet metal and of thin cross-section to provide a multiplicity of closely spaced vanes. Each vane has a plurality of tabs 35, 36, 37, and 38 projecting from the outer arcuate edge E thereof and received within the recesses 31, 32, 33, and 34, respectively, of the casing 30. The inner edge or margin 40 of each vane is also provided with a plurality of tabs 41 and 42 received within slots 43 and 43a in an annular substantially semi-toroidal core ring or shroud 45.

In the manufacture of hydrodynamic coupling elements, such as the vaned driving element or impeller 11, it is desirable that the casing 30 of the impeller be preferably formed of aluminum or other light weight metal having considerable structural strength, and that the vanes be made of sheet metal, such as steel, for the reason that hydrodynamic coupling devices of the torque-converting type are used with high speed machines for the transmission of torque, and the impeller, as well as the runner, rotate at high speed which creates centrifugal forces and torsional stresses of considerable magnitude, and it is, therefore, desirable that the rotating masses be kept as small as possible in weight to decrease the centrifugal forces arising at operating speeds, reduction of weight with an increase in the factor of safety being desirable. Uses of such light metals materially decreases the weight of the coupling elements with consequent reduction of the moment of inertia while providing additional factors of safety, reduction of vibration, and avoidance of wear on the bearings mounting the coupling device.

It has been proposed that the casing and vanes, such as an impeller, be cast as an integral unit. However, such casting of the vaned element requires that two dies be utilized, one to form the exterior of the impeller casing and the other to form the interior of the impeller casing as well as the vanes. It will be apparent that, when the vanes are necessarily curved, for example, as shown in the impeller element 11, that the die or mold inside and forming the interior of the casing as well as the vanes, must be withdrawn in an axial direction which may readily result in breakage of the aluminum vanes due to the resisting effort of the curved vanes upon such relative axial movement of the die or mold. It has also been proposed that the impeller casing alone be cast as a separate unit, and sheet metal vanes, separately formed to the desired curvatures, be then inserted within and connected to the casing. As aluminum and steel cannot be welded together to provide a satisfactory bond in coupling devices, the use of mechanical connecting means is conventional for securing the sheet metal steel vanes to the aluminum casing which usually involves bending or otherwise permanently distorting the thin sheet metal vanes out of their critical curvature to insert the vanes in the casing and to obtain coaction between the mechanical connecting means, with consequent impairment of the desired function of the vanes in controlling the directional flow of fluid through the vaned element.

The present invention contemplates that the casing 30 of the impeller element be formed of aluminum, with the thin sheet metal vanes being inserted within and connected to the casing without bending or otherwise distorting the bodies of the vanes from their desired fluid flow-controlling curvatures. For this purpose, the sheet metal vanes are formed as stampings, each having the required curvature and having tabs projecting from the inner and arcuate edges thereof and having the formation shown in Figs. 2 and 9. The aluminum casing is cast preferably by a die-casting method to provide the plurality of sets of recesses 31 to 34, inclusive, therein. In the casting operation, a mold apparatus, shown in Fig. 10, comprises cooperating male and female molds A and B arranged to define a mold cavity, the female mold being utilized to form the exterior of the casing 30, which includes the semi-toroidal body portion thereof as well as a plurality of fins 51 disposed radially of the axis of the annular casing and extending from the inner circumference thereof radially outward and then axially as clearly shown in Fig. 2, these fins being advantageous in effecting cooling during operation of the torque converter. The male mold A positioned within the female mold B, forming the exterior of the casing, forms the interior of the casing including the sets of recesses 31 to 34, inclusive, in the inner surface of the casing, and it will be readily apparent that the male mold is provided with a suitable number of elongate projections *a*, *b*, *c*, and *d*, designed to form the said recesses in the casing so that the recesses 31, 32, 33, and 34, receiving the tabs on a vane, are disposed in different radial planes and at such angles with respect to each other for receiving the associated tabs 35 to 38, inclusive, of the vane 14 so that the tabs on the vanes may be inserted within the recesses without bending the vane tabs and thereby the vanes when assembling the vanes with the casing. It may be noted from an inspection of Figs. 2, 7 and 8 that the recesses 31 in the casing extend in an axial direction, and, as shown in Fig. 2, the recesses 32 in the casing are of frusto-conical form, the recesses 33 and 34 being substantially rectangular in outline and the projections *a*, *b*, *c*, and *d*, on the male mold being formed to provide such shaped recesses.

Referring to Figs. 5, 6, and 8, each recess 31 in the casing, as previously described, extends in an axial direction toward the front of the casing and to and through a shoulder 46 provided at the juncture of the inner surface 47 of the casing, with the radially outer extremity of the vane-engaging surface 39 to permit the straight axial withdrawal of the radially outer projection of the male mold A through the vaned tab-receiving recess 31 upon cooling of the casting. It will be apparent that the projections on the mold, forming the recesses 31, 32, 33, and 34 in the casing, can be readily removed from such recesses upon coaxial relative movement of the male mold and the cast casing in view of the various designated shapes of these recesses being particularly designed for this purpose.

It may be noted from an inspection of Fig. 2 that the formation of recesses 31 to 34 in the casing 30 to permit straight axial withdrawal of the male die or mold also would cause the tabs 35 to 38 of the vanes to be displaced from their recesses in the casing with consequent disassembly of the vanes and casing. The present invention contemplates means for holding the vanes in engagement with the casing, including a novel mechanical structure interlocking the vanes and casing in the assembled structure of the impeller. For this purpose after the casing 30 has been cast as previously described, an annular groove 48 is machined in the outer periphery of the surface 39 of the casing, adjacent the shoulder 46 and intersecting the recesses 35 in the casing, the annular groove being clearly shown in Figs. 5, 6, and 7 and receiving an interlocking element or member 49 in the form of a snap ring. The snap ring 49 is inserted within the groove 48 and allowed to expand to the bottom in the groove and substantially fill the groove, the exterior surface of the ring being then generally aligned with the inner surface 39 of the casing. The ring thus extends through the recesses 31 in the casing. The tab 35 of each vane is provided with a notch 50, as shown in Figs. 5 and 9, through which the ring 49 extends, whereby the vane tabs 35 are held against movement in an axial direction out of the recesses 31 in the casing thereby securely interlocking the vane tabs 35 and casing 30 when assembled as shown in Figs. 2 and 5. In the assembly of the casing 30, vanes 14 and core ring 45, the vanes are assembled with the casing by positioning the radially outer ends of the tabs 35 of the vanes in the recesses 31 of the casing and with the ring 49 in the casing groove 31 received within notches 50 of the vanes. The vanes are then rotated in radial planes inwardly in a counter-clockwise direction toward the axis of the casing 30 and about the connection of the ring 49 and vane tabs 35 to insert the tabs 35 completely within the recesses 31 and to position the vane tabs 36, 37 and 38 successively in the recesses 32, 33 and 34 in the casing. The assembly of the impeller is then completed by movement of the core ring 45 towards the casing with the axes of the core ring and casing in alignment for positioning the vane tabs 41 and 42 (Fig. 9) within the slots or openings 43 and 43*a*, respectively, of the core ring 45, the slots 43 and 43*a* being angularly disposed with respect to radial planes extending through the axis of the casing to conform to the similarly angularly disposed vane tabs 41 and 42 and cooperating with the vane tabs for ready reception for this purpose during such movement of the core ring toward the vanes. Upon the outer curved surface of the core ring engaging the inner complementary curved edges of the vanes, the vane tabs are then bent over to engage the inner curved surface of the core ring to hold the core ring securely in place on the vanes. Prior to the assembly of the core ring to the vanes of the casing and vane sub-assembly, the vane tabs 36, 37 and 38 are not securely held in the casing recesses 32, 33 and 34 and may rotate in a clockwise direction relative to the casing to disengage the vanes from the casing. However, the described assembly of the core ring and vanes effectively prevents, in conjunction with the interlocking snap ring 49, any possibility of rotation of the vanes, or other movement of the vanes, out of the recesses 31, 32, 33, and 34 of the casing during operation of the hydrodynamic coupling device, the snap ring 49 preventing axial or any other directional movement of the assembled vanes and core ring relative to the casing.

Referring to Fig. 9, in the stamping operation to form the sheet metal vanes, the tabs 35, 36, 37, and 38 of each vane are respectively formed with crowned or bulged portions 35*a*, 36*a*, 37*a*, and 38*a* and these portions of the tabs, when received in the associated recesses 31 to 34 in the casing, will be distorted out of their original shape so that each bulged or crowned portion will engage a longitudinal wall of the associated recess, and the edges of the vane tab will engage the opposite longitudinal wall of the associated recess so that each vane tab is held under tension to prevent vibration or rattle of the vane tabs in the casing recesses.

Fig. 11 illustrates a slightly different manner of connecting the radially outer tabs 35*b* of the vanes 14*a* to the casing 30 wherein each tab 35*b* is not provided with the notch receiving the snap ring as in the previously described vane and only abuts the snap ring 49.

Referring to Fig. 12 illustrating a modification of the invention shown in Figs. 1–10, inclusive, the inner surface 30*a* of the casing 30*b* may be formed with radially extending arcuate grooves 60 therein for receiving the complementary formed arcuate outer margins or edges 61 of vanes 14*b*, the radially outer end portion of each vane abutting a snap ring 49*b* to interlock the vanes and casing, in conjunction with the core ring 45*b*. It will be readily apparent that the grooves 60 in the casing may be formed by a die casting method, with the male die being readily removable in an axial direction to permit removal of the die from the cast casing.

From the foregoing description, it will be apparent that we have provided improved, fabricated hydrodynamic coupling elements and the methods of making the same which have been particularly designed for ready assembly purposes and featuring new and novel means adapted to permit assembly of the component parts of the vaned element which may comprise a casing, vanes, and a core ring or shroud of a hydraulic torque converter without distortion of the vanes from their critical fluid-controlling curvatures while acting to securely maintain the parts in assembly during operation of the device despite stresses and strains placed thereon by the forces engendered in effecting rotation of the fluid, particularly in the multiplication of torque. We wish it to be understood that the invention is not to be limited to the specific constructions of hydrodynamic coupling devices and to the specific methods for making the same which are shown and described, except only insofar as the claims may be so limited, that it will be apparent to those skilled in the art that changes may be made without departing from the principles of the invention. In particular, we wish it to be understood that the invention is not to be limited to torque-converting coupling devices to the exclusion of non-converting coupling devices, unless the claims are so limited. Furthermore, we wish it to be understood that, although the embodiments of the invention illustrated are in connection with an impeller element, the invention is not to be limited to an impeller element to the exclusion of driven and stator elements in a hydrodynamic coupling device, unless the claims are so limited.

We claim:

1. In a vaned element of a hydrodynamic coupling device, the combination of a hollow casing, a vane fitting within and engaging said casing, and means holding said vane in engagement with said casing and comprising a member disposed between and providing an interlocking connection between said vane and casing, said member extending transversely of said vane and through said vane, and means for preventing lateral movement of said vane at said interlocking connection.

2. In a vaned element of a hydrodynamic coupling device, the combination of a hollow casing member, a vane member fitting within and engaging said casing member, and means holding said vane member in engagement with said casing member and comprising a member disposed between said casing and vane members and inserted within a recess in one of said casing and vane members and abutting the other of said casing and vane members for providing an interlocking connection between said vane and casing members, and means for preventing lateral movement of said vane at said interlocking connection.

3. In a vaned element of a hydrodynamic coupling device, the combination of a hollow casing, a plurality of vanes fitting within and engaging said casing, and means holding said vanes in engagement with said casing and comprising means disposed within recesses in said vanes and casing and providing an interlocking connection between said vanes and casing and interengaging means on said vanes and casing for preventing lateral movement of said vanes at said interlocking connection.

4. In a vaned element of a hydrodynamic coupling device, the combination of a hollow casing having a substantially semi-toroidal inner surface with an annular circumferential groove therein, a plurality of vanes fitting within said casing and engaging said surface, and means holding said vanes in engagement with said casing and comprising means in said groove and abutting said vanes for providing an interlocking connection between said vanes and casting, and means for preventing lateral movement of said vanes relative to said casing at the interlocking connection between said vanes and casing.

5. In a vaned element of a hydrodynamic coupling device, the combination of a hollow casing having a substantially semi-toroidal inner surface with radially spaced sets of circumferentially spaced recesses therein and an annular circumferential groove intersecting the recesses of one of said sets; a plurality of vanes fitting within said casing and engaging said surface and having a plurality of projections received within said recesses; and an annular element in said groove and abutting the vane projections disposed in the recesses intersected by said groove.

6. In a vaned element of a hydrodynamic coupling device, the combination of a hollow casing having a substantially semi-toroidal inner surface with radially spaced sets of circumferentially spaced recesses therein and an annular circumferential groove intersecting the recesses of one of said sets; a plurality of vanes fitting within said casing and engaging said surface and having a plurality of projections received within said recesses; and means in said groove and abutting the vane projections disposed in the recesses intersected by said groove.

7. In a vaned element of a hydrodynamic coupling device, the combination of a hollow annular casing having a substantially semi-toroidal inner surface with radially spaced sets of circumferentially spaced recesses therein and an annular circumferential groove intersecting the recesses of one of said sets; a plurality of vanes fitting within said casing and engaging said surface and having a plurality of projections received within said recesses, and each of the projections in the recesses of said one set having an opening aligned with said groove, and interlocking means in said groove of said casing and in said openings in said vane projections.

8. In a vaned element of a hydrodynamic coupling device, the combination of a hollow casing with an inner substantially semi-toroidal surface having radially spaced grooves therein and an annular circumferential groove intersecting said grooves; a plurality of vanes having arcuate edges fitting within said radially spaced grooves; and an annular resilient element in said circumferential groove and abutting the vanes disposed in the radially spaced grooves and interlocking said vanes and casing.

9. In a vaned element of a hydrodynamic coupling device, the combination of a hollow casing having a substantially semi-toroidal inner surface with radially spaced grooves therein and an annular circumferential groove intersecting the same; a plurality of vanes having arcuate edges fitting within said radially spaced grooves; and means in said circumferential groove and abutting the vanes disposed in said radially spaced grooves and interlocking said vanes and casing.

10. In a vaned element of a hydrodynamic coupling element, the combination of a hollow annular casing having a substantially semi-toroidal inner surface provided with a plurality of radially spaced sets of circumferentially spaced slots, said casing having a circumferentially extending annular groove intersecting the ends of the radially outermost slots nearest to the radially outer extremity of said surface; a plurality of substantially semicircular curved vanes fitting within said casing and engaging said surface thereof, said vanes having spaced tabs on the inner and outer arcuate margins thereof with said tabs on the outer margins being received within said slots; a substantially semi-toroidal core ring engaging the inner arcuate margins of said vanes and having openings therein receiving the tabs on the inner margins of said vanes, said last-mentioned tabs being bent to engage the inner curved surface of said core ring; and a snap ring disposed within said groove and engaging the vane tabs in the adjacent slots and preventing movement of said vanes and core ring relative to said casing.

References Cited in the file of this patent

UNITED STATES PATENTS

| | | |
|---|---|---|
| 1,341,682 | Starker | June 1, 1920 |
| 1,550,662 | Anderson | Aug. 25, 1925 |
| 1,868,146 | Kiep | July 19, 1932 |
| 1,876,518 | Mathis | Sept. 6, 1932 |
| 1,983,558 | Morin et al. | Dec. 11, 1934 |
| 1,992,332 | Spencer | Feb. 26, 1935 |
| 2,061,997 | Dunn | Nov. 24, 1936 |
| 2,101,044 | Blettner | Dec. 7, 1937 |
| 2,205,054 | Wemp | June 18, 1940 |
| 2,336,231 | Dodge | Dec. 7, 1943 |
| 2,347,071 | Bailey | Apr. 18, 1944 |
| 2,357,295 | Thompson | Sept. 5, 1944 |
| 2,358,469 | Neracher | Sept. 19, 1944 |
| 2,360,383 | Zeidler | Oct. 17, 1944 |
| 2,387,722 | Dodge | Oct. 30, 1945 |
| 2,390,445 | Mercier | Dec. 4, 1945 |
| 2,429,503 | Zeidler | Oct. 21, 1947 |
| 2,439,630 | Nutt | Apr. 8, 1948 |
| 2,473,185 | Weiss | June 14, 1949 |
| 2,503,025 | Bolender | Apr. 4, 1950 |
| 2,598,620 | Swift | May 27, 1952 |

FOREIGN PATENTS

| | | |
|---|---|---|
| 590,433 | Great Britain | July 17, 1947 |